US 6,675,792 B2

United States Patent
Suba et al.

(10) Patent No.: US 6,675,792 B2
(45) Date of Patent: Jan. 13, 2004

(54) KIT FOR CONVERTING CONVENTIONAL PITCHING MACHINE INTO A VIDEO PITCHING MACHINE

(75) Inventors: Michael T. Suba, Fairfield, CT (US); Michael DeVasto, Trumbull, CT (US); Timothy O'Reilly, Oxford, CT (US); Gregory J. Battersby, Westport, CT (US)

(73) Assignee: ProBatter Sports, LLC, Milford, CT (US)

(*) Notice: Subject to any disclaimer, the term of this patent is extended or adjusted under 35 U.S.C. 154(b) by 0 days.

(21) Appl. No.: 10/183,248

(22) Filed: Jun. 27, 2002

(65) Prior Publication Data

US 2002/0174859 A1 Nov. 28, 2002

Related U.S. Application Data

(63) Continuation-in-part of application No. 09/776,659, filed on Feb. 6, 2001, now Pat. No. 6,546,924, which is a continuation of application No. 09/259,722, filed on Mar. 1, 1999, now Pat. No. 6,182,649.

(51) Int. Cl.[7] .................................................. F41B 4/00
(52) U.S. Cl. .......................................... 124/78; 124/32
(58) Field of Search .............................. 124/6, 32, 34, 124/37, 49, 50, 51.1, 78

(56) References Cited

U.S. PATENT DOCUMENTS

| 5,195,744 A | * | 3/1993 | Kapp et al. |
| 5,344,137 A | * | 9/1994 | Komori |
| 5,359,986 A | * | 11/1994 | Magrath et al. |
| 6,305,366 B1 | * | 10/2001 | Rizzo et al. |

* cited by examiner

Primary Examiner—John A. Ricci
(74) Attorney, Agent, or Firm—Grimes & Battersby, LLP

(57) ABSTRACT

The present invention consists of a conversion kit for converting a pitching machine of the type having at least one wheel into a video pitching machine. The kit includes: a projection screen; projector; ball injector; and control system. The projection screen, which is adapted to be positioned between the pitching machine and a batter, includes an aperture through which a ball may be delivered to the batter by the pitching machine. The video projector must be able to project the video image of an actual pitcher onto the projection screen. The injector is adapted to hold a ball in a queued position immediately behind the pitching machine and inject the ball into the pitching machine to be propelled toward the batter in synchronization with the video image. The injector includes an electric solenoid for injecting the ball into the pitching machine. The control system is for storing the video image and displaying the video image onto the screen as well as for causing the injector to inject the ball into the pitching machine in full synchronization with the video image displayed on the screen.

11 Claims, 2 Drawing Sheets

KIT FOR CONVERTING CONVENTIONAL PITCHING MACHINE INTO A VIDEO PITCHING MACHINE

RELATED APPLICATIONS

This is a continuation-in-part application of U.S. patent application Ser. No. 09/776,659 filed on Feb. 6, 2001 is now U.S. Pat. No. 6,546,924 for "Ball Throwing Machine & Method for Profiling Pitches," which, in turn is a continuation of U.S. patent application Ser. No. 09/259,722 filed on Mar. 1, 1999 for "Ball-Throwing Machine" and which subsequently issued on Feb. 6, 2001 as U.S. Pat. No. 6,182,649.

FIELD OF THE INVENTION

The present invention relates generally to a kit for converting a conventional pitching machine into a video pitching machine, more particularly, to such a kit that can be used in combination with conventional, wheeled baseball and/or softball pitching machines to add a video component thereto.

DESCRIPTION OF THE PRIOR ART

Pitching machines and ball-throwing machines are well-known in the art and generally fall into four categories: (1) machines that employ a spring actuated arm mechanism to propel the ball; (2) machines that employ at least one rotating wheel or a pair of rotating, coasting wheels to propel the ball; (3) machines that rely on pneumatic pressure to propel the ball; and (4) machines that employ converging and diverging rotatable discs to propel the ball.

Wheeled pitching machines have been the industry standard for many years. Companies such at ATEC of Sparks, Nev.; The Jugs Company of Tulatin, Oreg.; and Bata Baseball Machines of San Marcos, Calif. have long marketed two wheeled pitching machines used in both a training environment as well as for commercial batting cages. In a commercial environment, these machines are typically installed in individual batting cages, frequently with ball retrieval systems. The machines are mounted at one end of the cage with the hitter at the opposite end. The only warning that a hitter receives that a pitch is about to be delivered is a light that may (or may not) illuminate above the machine indicating that a ball is about to be delivered. In some instances, operators use clear tubing as a ball feed to permit batters to actually see the ball as it rolls into the machine so that they can know that the next pitch is about to be delivered.

On the training side, the use of such machines is frequently a problem for serious players since the success of most players at higher levels (and faster pitching speeds) is an ability to properly time a pitch. Obviously, timing a ball as it rolls down a tube is vastly different from timing the windup and release of an actual pitcher in game-like conditions. This timing difference is one reason why some coaches discourage their hitters from working in batting cages during the season.

The incorporation of a video display in combination with such conventional wheeled pitching machines has been known for quite some time. See, for example, U.S. Pat. No. 5,195,744 which issued on Mar. 23, 1993 to Neil S. Kapp et al. for Baseball Batting Practice Apparatus with Control Means where a ball is introduced into a conventional pitching machine by a gravity drop which is timed in synchronization with a video display. The synchronization means of such device relies upon an audio signal generated by the video, without any regard to the status of the ball in the queued position. Furthermore, the ball queuing system of this device relies on gravity and is imprecise and subject to failure.

ProBatter Sports, LLC of Milford, Conn. markets its "Professional" line of video pitching simulators which employ substantially more complex video control systems in conjunction with a multi-pitch pitching machine. The Pro-Batter systems are described in greater detail in U.S. Pat. No. 6,182,649 which issued on Feb. 6, 2001 in the name of Gregory J. Battersby et al. for a Ball-Throwing Machine; U.S. Pat. No. 6,186,133 which issued on Feb. 13, 2001 in the name of Gregory J. Battersby et al. for System and Method for Establishing Pitch Parameters in a Ball-Throwing Machine; and U.S. Pat. No. 6,186,134 which issued on Feb. 13, 2001 in the name of Gregory J. Battersby et al. for Pitching System with Video Display Means, the disclosures of which are all incorporated herein by reference thereto.

Chin Music, LLC of Seattle, Wash. has also developed a computerized pitching machine which is marketed by Fastball Development Inc. for a product called "Abner." This technology is described more fully in U.S. Pat. No. 6,082,350 which issued on Jul. 4, 2000 for Accurate, Multi-Axis, Computer Controlled Object Projection Machine.

Master Pitching Machine recently began marketing a product called the LED Pitcher which is an LED display system of a simulated pitcher which they mount in advance of their spring actuated Iron Mike machine. The machine utilizes two cams on the machine, the first to turn on the LED Pitcher and the second to release the ball. The LED screen is mounted adjacent to the release point of the Iron Mike machine so that the ball comes off the side of the screen. As such, portions of the arm of the LED pitcher are lost as the arm gets closer to the release point. In addition, the LED image is vastly different from a video image in that motion is in stepped phases as opposed to the fluid motion of a video image. Finally, as a result of the LED makeup, it is impossible to change pitcher images as is the case with a video image where interchangeable video images can be used interchangeably.

None of these systems specifically address the creation of a conversion kit for existing pitching machines to permit them to include a video component and, more importantly, the ability to be used in conjunction with baseball and softball machines, both individually and in combination with a common control cabinet and projection system.

SUMMARY OF THE INVENTION

Against the foregoing background, it is a primary object of the present invention to provide a kit for converting a conventional wheeled pitching machine to a video pitching machine.

It is another object of the present invention to provide such a kit which can be used for both baseball and softball machines individually.

It is yet another object of the present invention to provide such a kit which can be used in conjunction with a combined baseball and softball machine which share a common control box and projection system.

It is still another object of the present invention to provide such a kit which permits precise introduction of the ball into the pitching machine.

To the accomplishments of the foregoing objects and advantages, the present invention, in brief summary, comprises a conversion kit for converting a pitching machine of the type having at least one wheel into a video pitching machine. The kit includes: a projection screen; projector; injector means; and control means. The projection screen, which is adapted to be positioned between the pitching machine and a batter, includes an aperture through which a ball may be delivered to the batter by the pitching machine. The video projector must be able to project the video image of an actual pitcher onto the projection screen. The injector means is adapted to hold a ball in a queued position immediately behind the pitching machine and inject the ball into the pitching machine to be propelled toward the batter in synchronization with the video image. The injector means includes an electric solenoid for injecting the ball into the pitching machine. Control means are provided for storing the video image and displaying the video image onto the screen as well as for causing the injector to inject said ball into the pitching machine in full synchronization with the video image displayed on the screen.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE PREFERRED EMBODIMENTS

The present invention comprises a conversion kit that can be used in conjunction with a conventional wheeled pitching machine, preferably a two-wheel machine such as, for example, the Casey Pro system marketed by ATEC, to covert such conventional wheeled pitching machine into a video pitching machine, i.e., a pitching machine that includes a video component having a projection screen mounted between the pitching machine and a batter on which a video of an actual pitcher is displayed in synchronization with the actual release of a pitch by the pitching machine.

It will be appreciated that the conversion kit of the present invention can be used in conjunction with virtually any wheeled pitching machine, preferably of the type marketed by ATEC, Jugs, Amusement Products and others. Specifically, it can be used with either a one or two wheeled machine and is adaptable to be used singularly with either a baseball pitching machine or a softball pitching machine (as illustrated in FIG. 1) or in conjunction with a combination baseball/softball pitching machine.

Figure 1:
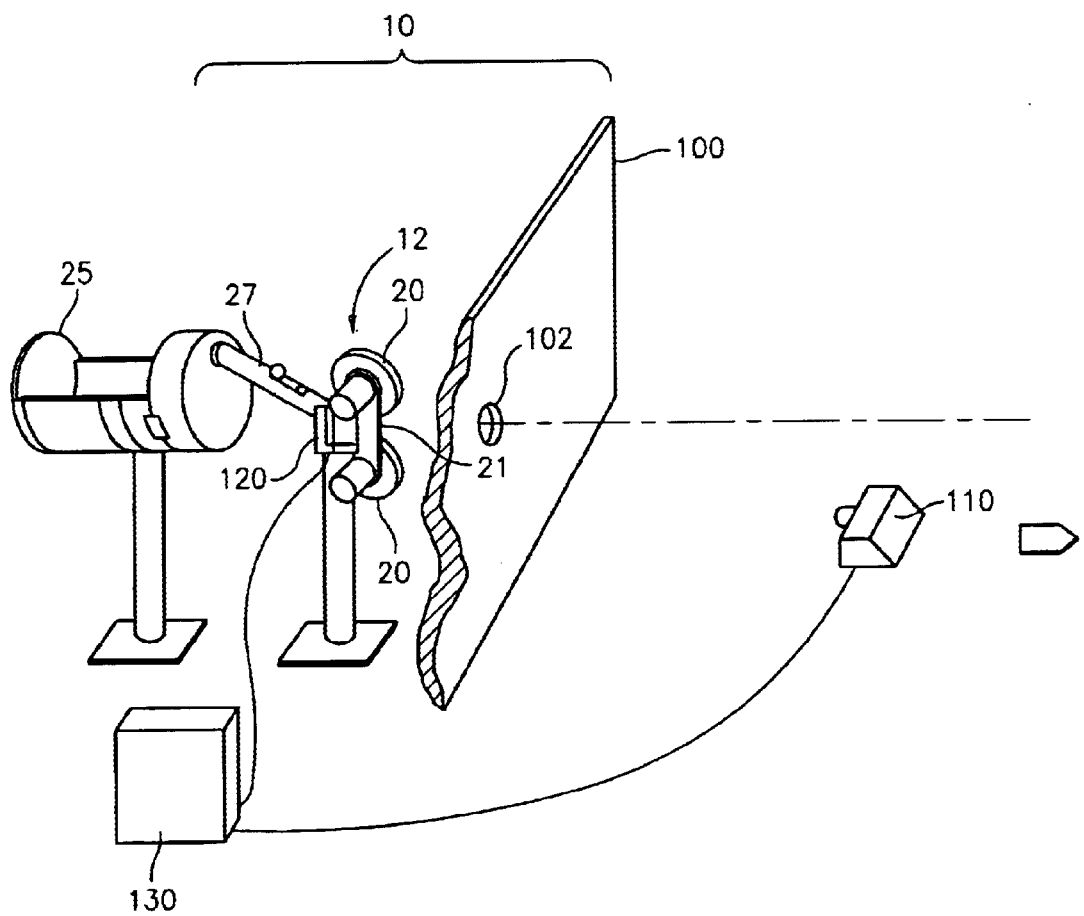
FIG. 1 is a perspective illustration of a two-wheeled baseball pitching machine that includes the subject video conversion kit for a two wheeled pitching machine.

FIG. 1 illustrates, in general terms, a setup in which the conversion kit of the present invention, referred to generally by reference numeral 10, is mounted in conjunction with a conventional ATEC commercial baseball pitching machine referred to generally by reference numeral 12.

Wheeled pitching machine of the type shown in the accompanying drawings typically include at least one and as many as four rotating wheels 20. The most common machines (as illustrated) include at least two wheels 20. In multi-wheel machines, the space between the rotating wheels 20 is called the "nip" 21 which is where a ball is inserted in order to propel the ball toward a hitter. The speed of each wheel is individually controlled to permit changes to pitch speed. Such machines can be hand fed or, as shown in FIG. 1, using an automatic feeder 25 which can store up to 300 balls at a time. These stored balls are delivered, one at a time, to the pitching machine 12 through a delivery tube 27. In the past, balls would be delivered directly to the nip 21 from the feeder 25 for delivery to the hitter (not shown).

The conversion kit 10 of the present invention includes a projection screen 100 which is mounted in front of the conventional pitching machine 10 on which the video image of an actual pitcher is displayed; a video projector 110 for displaying such video image on the projector screen; an injector unit 120 which is secured to the pitching machine 12 for injecting a ball delivered from the feeder 25 into the nip 21 of the pitching machine 12 between the wheels 20 for delivery of the ball to a batter in synchronization with the video display of an actual pitcher on the projection screen 100 by the video projector 110; and a control unit 130 which controls the entire system. In this manner, the original pitching machine 12 can be easily converted into a video pitching machine so that a hitter can properly time the delivery of a ball thrown by the pitching machine 12.

The projection screen 100 includes a hole or aperture 102 in the screen in alignment with the pitching machine 10 to permit a ball thrown by the pitching machine 10 to travel therethrough. The projection screen 100 includes a fabric screen mounted on a steel projector frame (not shown) to provide the requisite support for the fabric screen. The actual projection screen 100 is fabricated from a white fabric capable of absorbing the impact of a baseball thrown or hit into the screen and is typically mounted on the projector frame using a shock absorbing connector such as, for example, bungee cords, to reduce the rebound affect should a batted ball hit the screen.

The video projector 110 can be virtually any video projector but is preferably an LCD projector of the type manufactured and marketed by such projection companies as Mitsubishi, Hitachi, Proxima and others. The video projector 110 is adapted to project a video image of an actual pitcher onto the projection screen, the showing of which is fully timed and synchronized with the release of a ball by the pitching machine 10 through the aperture 102 in the screen 100.

Figure 2:
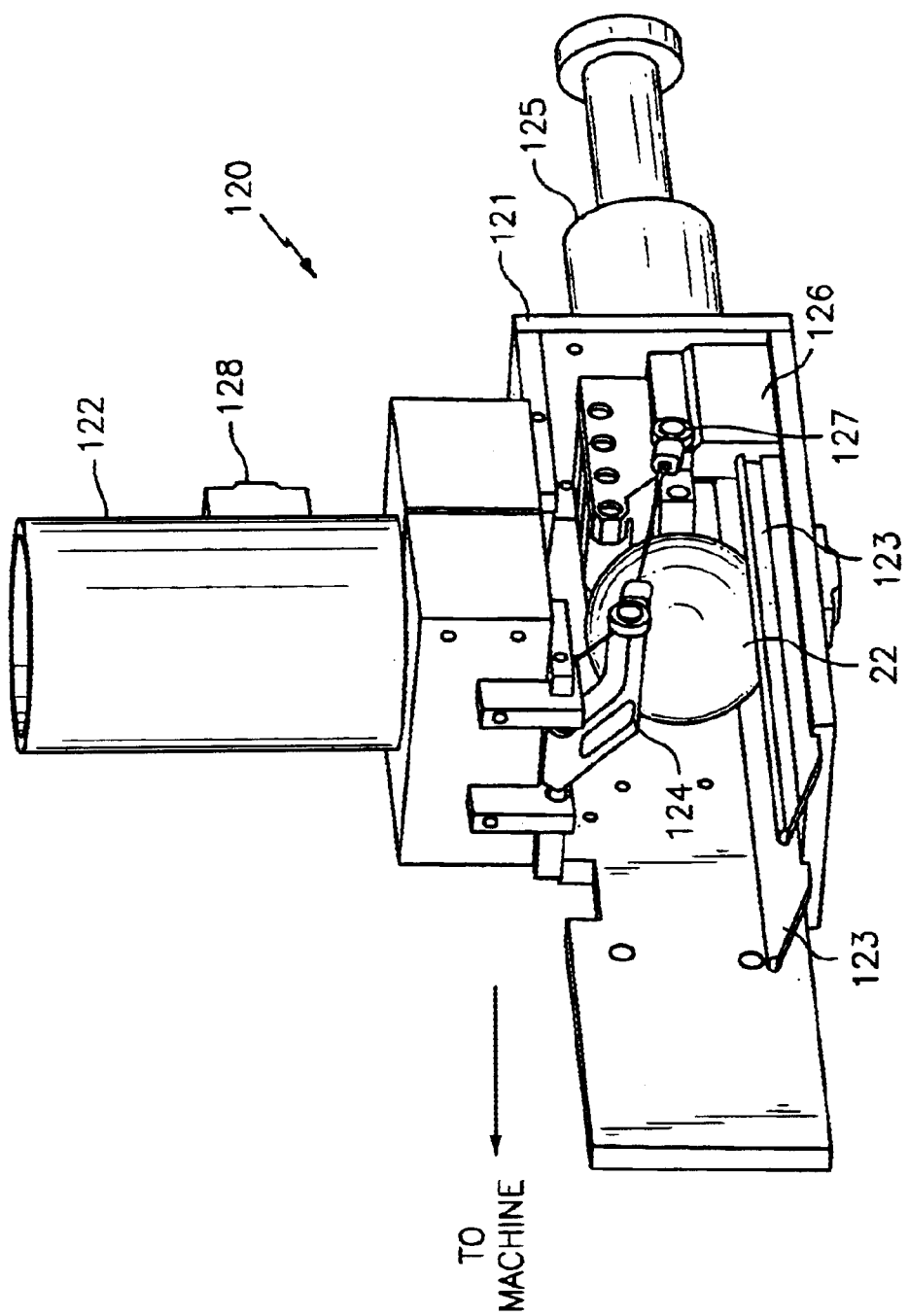
FIG. 2 is an enlarged, perspective view of the injector unit that is included in the conversion kit of the present invention.

The conversion kit of the present invention further includes an injector unit 120 (as shown in greater detail in FIG. 2) which is mounted on and secured to the back of the pitching machine 12 by conventional securing means such as, for examples, bolts or weldments, in the vicinity of the nip 21 of the machine 12. As shown in FIG. 2, the injector unit 120 includes an injector housing 121 which includes a top entry tube 122 which is connected to the delivery tube 27 from the feeder 25 through which balls are introduced by gravity. Once inside the center housing 121, each ball 22 ultimately comes to rest in a queued position inside the housing 121 on a pair of tracks 123. The ball 22 is prevented from rolling into the pitching machine 12 by a flipper bar 124. Flipper bar is pivotally mounted at one end to the upper surface of the inside of the housing 121. Additional balls (not shown) fed from the feeder 25 for subsequent delivery to a batter may be stacked up above the ball 22 in the queued position where they would extend upwardly into the entry tube 122.

An injector 125, preferably an electrically-operated solenoid of the type manufactured by The Trombetta Corporation, is provided at one end of the injector housing 121 at the end of the housing 121 opposite the end adjacent to the pitching machine 20. A particularly preferred solenoid is Trombetta Model No. Q516, 3.5" stroke, single action, push type, 90 v DC with a spring return. Injector 125 includes a push rod 126 which is adapted to push or inject the ball 22 into the pitching machine 20 upon activation of the injector 125. Upon activation of the injector 125, the push rod 126 is caused to advance toward the ball 22 and inject it into the nip 21 of the pitching machine 12.

The injector 125 is in communication with and controlled by the control unit 130. Flipper rod 127 connects the push rod 126 to the end of the flipper bar 124 opposite the pivotally mounted end. In this manner, as the push rod advances toward the ball 22 to inject it into the machine, it simultaneously causes the flipper bar 124 to rotate upwardly and clear the path for the ball to be injected into the machine 12.

Sensor 128 is provided through the entry tube 122 to detect the presence of balls stacked up above the ball 22 in the queued position.

The control unit 130 is a standard Windows based personal computer which includes at least two parallel ports, a microprocessor and operating software capable of multitasking, a hard drive preferably having at least 10 Gigabytes of storage space, a video card and a control card. It includes an interface box that connects to one of the parallel ports on the personal computer and has inputs for the motors for the pitching machine 12, the feeder 25, the ball sensor 128, coin input and outputs for the coin operating unit (not shown). The control unit 130 is in communication with the injector 125 and the sensor 128 in the injector unit; the feeder 25; and the video projector 110.

In operation, the software watches the inputs, looks for the pitching machine motors to be in an "on" position, the feeder 25 to be in an "on" position and the ball sensor 128 to be activated, i.e., a ball is resting in the queued position. It also determines in a combination unit whether the baseball pitching machine or the softball pitching machine is to be activated and, depending upon the machine activated, is prepared to display the companion video for the appropriate machine, i.e., a softball pitcher for use with the softball machine and a baseball pitcher for use with the baseball machine. Multiple video images are stored on the hard drive and the user has the ability to also manually select different images.

With balls detected in the injector unit 120, the converted video pitching system is now ready to begin operation. Upon activation of the system by a standard pitching machine control box (not shown) supplied by the pitching machine company, the system is now ready to operate. The control unit 130 accesses the video image and begins a display thereof on the projection screen 100 from the projector 110. Upon the commencement of the display of the video image on the screen, an internal timer in control unit 130 commences and upon a pre-determined time coordinated with the video image, the control unit signals the injector unit 120 to fire the injector 125 and inject the ball into the pitching machine where it is delivered to the batter in synchronization with the video image being displayed on the projection screen 100. The control unit can adjust the timing of the video should they be required to effect synchronization.

Control unit 130 is able to display a variety of different images onto the projection screen 100 by sending such images to the projector 110. Such images may include, for example, images of different pitchers, advertising messages, and the like.

Having thus described the invention with particular reference to the preferred forms thereof, it will be obvious that various changes and modifications can be made therein without departing from the spirit and scope of the present invention as defined by the appended claims.

Wherefore, we claim:

1. A conversion kit for converting a pitching machine of the type having at least one wheel into a video pitching machine, said kit including:
   a projection screen adapted to be positioned between said pitching machine and a batter, said screen including an aperture to permit a ball delivered by said pitching machine to pass therethrough;
   a video projector for projecting the video image of an actual pitcher on said screen;
   injector means for holding the ball in a queued position immediately behind said pitching machine and injecting said ball into said machine to be propelled toward said batter in synchronization with said video image, said injector means comprising an injector unit that includes a solenoid for injecting said ball into said pitching machine; and
   control means for causing said injector to inject said ball into said pitching machine.

2. The conversion kit of claim 1, wherein said video projector is an LCD projector.

3. The conversion kit of claim 1, wherein said projector screen is a fabric screen shock mounted to a rigid frame.

4. The conversion kit of claim 1, wherein said solenoid is an electric solenoid.

5. The conversion kit of claim 4, wherein said injector unit includes at least one track on which said ball rests in queued position prior to injection into said machine.

6. The conversion kit of claim 4, wherein said injector unit further includes a flipper mechanism for retaining said ball in a queued position.

7. The conversion kit of claim 1, wherein said control unit is interconnected to said projector and said injector means.

8. The conversion kit of claim 7, wherein said control unit includes a microprocessor and a hard drive on which said video images are stored.

9. The conversion kit of claim 8, wherein said control unit is able to control the number of balls delivered from an external feeder source to the injector means.

10. The conversion kit of claim 9, wherein said control unit is able to cause the projector to display the video image on the screen and actuate the injector means to cause to ball to be injected into the pitching machine and delivered by the pitching machine to a batter in synchronization with the video image.

11. A conversion kit for converting a pitching machine of the type having at least one wheel into a video pitching machine, said kit including:
   a projection screen adapted to be positioned between said pitching machine and a batter, said screen having an aperture through which a ball may delivered to said batter by said pitching machine;
   a video projector for projecting the video image of an actual pitcher on said screen;
   injector means for holding a ball in a queued position immediately behind said pitching machine and injecting said ball into said machine to be propelled toward said batter in synchronization with said video image, said injector means including an electric solenoid for injecting the ball into the pitching machine; and
   control means for storing said video image and displaying said video image on said screen and for causing said injector to inject said ball into said pitching machine in full synchronization with the video image displayed on said screen.

* * * * *